(12) United States Patent
Sanil et al.

(10) Patent No.: US 10,430,664 B2
(45) Date of Patent: Oct. 1, 2019

(54) SYSTEM FOR AUTOMATICALLY EDITING VIDEO

(71) Applicants: Rohan Sanil, Fremont, CA (US); Jinjun Wang, San Jose, CA (US)

(72) Inventors: Rohan Sanil, Fremont, CA (US); Jinjun Wang, San Jose, CA (US)

( * ) Notice: Subject to any disclaimer, the term of this patent is extended or adjusted under 35 U.S.C. 154(b) by 256 days.

(21) Appl. No.: 15/072,258

(22) Filed: Mar. 16, 2016

(65) Prior Publication Data

US 2017/0024614 A1 Jan. 26, 2017

Related U.S. Application Data

(60) Provisional application No. 62/133,867, filed on Mar. 16, 2015.

(51) Int. Cl.
*G11B 27/00* (2006.01)
*G06K 9/00* (2006.01)
*G11B 27/031* (2006.01)
*G06F 17/30* (2006.01)

(52) U.S. Cl.
CPC ... *G06K 9/00751* (2013.01); *G06F 17/30781* (2013.01); *G11B 27/031* (2013.01)

(58) Field of Classification Search
CPC ............ G06F 17/30781; G11B 27/031; G06K 9/00751
USPC .................................................. 386/278, 262
See application file for complete search history.

(56) References Cited

U.S. PATENT DOCUMENTS

| 6,104,755 A * | 8/2000 | Ohara .................... H04N 5/145 348/446 |
| 2002/0036705 A1* | 3/2002 | Lee ........................ H04N 7/012 348/459 |
| 2003/0031382 A1* | 2/2003 | Broekaert ............... G06T 7/277 382/286 |
| 2005/0119547 A1* | 6/2005 | Shastri ................... A61B 5/055 600/407 |
| 2012/0082387 A1* | 4/2012 | Zhang ................ G06K 9/00973 382/201 |
| 2014/0126638 A1* | 5/2014 | Sievers ................ H04N 19/567 375/240.16 |
| 2014/0180998 A1* | 6/2014 | Sarrafzadeh ...... G06F 17/30321 706/52 |
| 2014/0321731 A1* | 10/2014 | Bryll ..................... G06T 7/0004 382/152 |
| 2015/0281710 A1* | 10/2015 | Sievert ................. H04N 19/164 375/240.02 |

(Continued)

*Primary Examiner* — Helen Shibru
(74) *Attorney, Agent, or Firm* — David R. Stevens; Stevens Law Group

(57) ABSTRACT

A system provides automated editing of a media file. Frames of a media file are extracted and feature vectors are generated based thereon. The feature vectors are clustered according to similarity of the content of the feature vectors and the temporal proximity of frames corresponding to the feature vectors in the media file. Clusters are ranked and selected according to the ranking. Segments of the media file corresponding to the selected clusters are combined into a highlight video. Hotspots in a media file may be identified in a media file by detecting local maxima in a measure of movement of pixels between frames. Clusters may be ranked and selected according to an iterative algorithm that identifies clusters that are the most different from an average of the feature vectors and from other selected clusters.

4 Claims, 14 Drawing Sheets

(56) References Cited

U.S. PATENT DOCUMENTS

| | | | |
|---|---|---|---|
| 2016/0171711 A1* | 6/2016 | Gopinath | G06T 7/13 382/130 |
| 2016/0254028 A1* | 9/2016 | Atkins | H04N 5/147 386/241 |
| 2017/0332125 A1* | 11/2017 | Panchaksharaiah | H04N 21/21805 |
| 2018/0114068 A1* | 4/2018 | Balasundaram | G06T 7/0004 |

* cited by examiner

SYSTEM FOR AUTOMATICALLY EDITING VIDEO

RELATED APPLICATIONS

This application claims the benefit of U.S. Provisional Application Ser. No. 62/133,867, filed Mar. 16, 2015, and entitled SYSTEM FOR AUTOMATICALLY EDITING VIDEO.

FIELD OF THE INVENTION

This invention relates to systems and methods for editing video content.

BACKGROUND OF THE INVENTION

Editing video is a time intensive task. Often, editing requires much more time than the actual preparation and filming of a scene. Often editing requires expensive software that requires extensive experience or training to use properly. Accordingly, the ability to edit video content is often out of reach for a typical person. This is unfortunate inasmuch as the ability of the typical person to record video has never been greater due to smart phone cameras, mountable action cameras (e.g. GOPRO cameras), and ever smaller and more affordable handheld video cameras.

Automatically analyzing multiple multimedia materials of different types to compose a new video is a very useful but difficult task. The difficulty comes from two aspects. First, how to define a generic strategy to select the appropriate portions from the inputs is difficult. There are a number of reported research works that are directed to home video or sports video, because domain-specific knowledge is used extensively in the video selection process for these types of video inputs. Also some commercial systems that allow the user to specify multiple video and image inputs to generate a video highlight are available. However, a variety of video genres exist, and hence a generic video selection criterion is more appropriate. Also, supporting multiple input materials of different types is difficult. Typical multimedia inputs consist of at least visual and auditory data in image, video and audio formats. A practical system should be able to analyze all these input formats to generate good video output.

Automatic composing new video from existing material would be a very useful function, and hence has attracted both research attention and industrial effort for many years. In the research domain, automatic home video editing system has been reported where the analysis of home video content for automatic low-quality portion removal and low-speech activity portion detection. Then the remaining portions are concatenated to compose a new video. Similarly, for sports video, most automatic video editing works focus on how to select semantic events from length sports video to compose a game highlight.

There also existing commercial products, such as Google Magisto, that accept user uploaded video and generate a video highlight by selecting portions from the uploaded videos and concatenating them with nice transition effects. Another such product is Muvee, that automatically aligns the visual contents to pre-defined sound track and compose a Music Video. There are, however, limitations to these approaches. First, there exist no generic video selection rules that work across different video genres. For this reason, a sports highlight generation system will not work with home video inputs. Also, visual content usually refers to not only video but also image content. There is some existing work that applies different rules for image and video. However, these require a large number of heuristically tuned parameters.

The systems and methods disclosed herein provide an improved approach for automated editing of video content.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
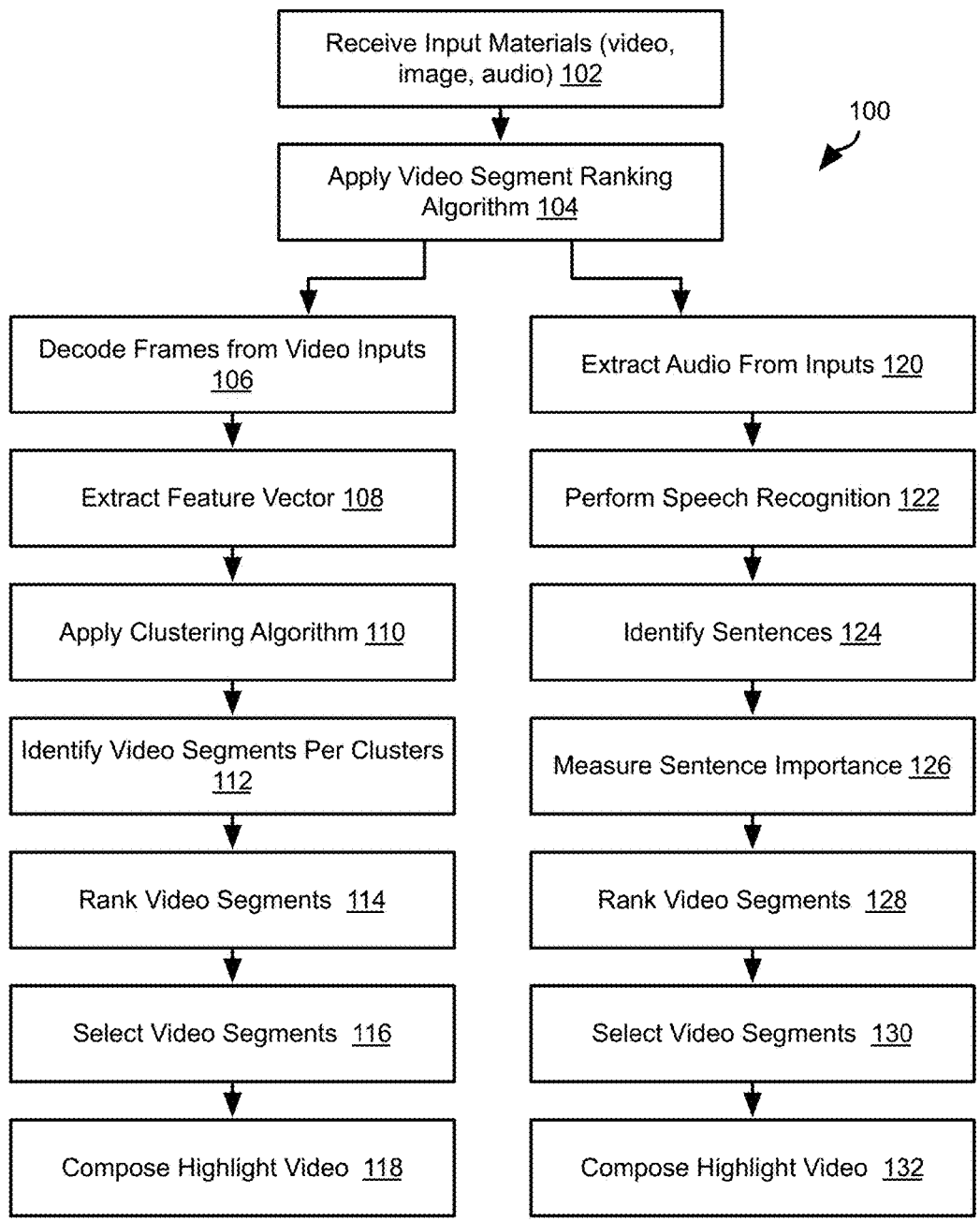
FIG. 1 is a process flow diagram of a method for generating a highlight video in accordance with an embodiment of the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The systems and methods disclosed herein provide a novel approach to editing that includes the ability to automatically combine video, audio and image materials to generate a new video. The systems and methods disclosed herein provide for the automated selection of appropriate video segments and then concatenating multiple selected segments to compose a new video.

The selection criteria can be based on, but is not limited to, ranking the importance of different portions in the video track or the audio track in the input videos. Ranking may be based on certain mathematic metrics or heuristic rules. Two strategies may be implemented in the current system. The first is based on measuring the energy of different portions in the video track and the second is based on measuring the amount of information in the text transcript of the input materials, obtained through an automatic-speech-recognition step.

Image input material may be supported by converting each image into a video of static frames and applying the same technique for ranking. Once a required number of segments is selected, a new video may be composed by concatenating the segments into a single video output, with pre-defined transition effects between each neighboring segments. The original audio track may then be replaced with the separate audio materials, where if the duration of the audio materials is shorter than the generated video, the audio may be repeated. Alternatively, if the duration of the audio materials is longer than the generated video, a sub-portion of audio material may be used. In one example, the entire system may be implemented on a cloud-computing platform to support current video generation requests.

For example, an application implementing the methods disclosed herein may be implemented as a cloud computing based service that allows the user to upload multiple video editing materials of different formats, such as videos in different codecs, and static images in different standards.

The service may then generate a new video based on a visual content and/or auditory content selection algorithms, where suitable segments from the materials are identified and then concatenated to compose a new video.

Referring to FIG. 1, the illustrated example method 100 may be executed by a computer system, such as a cloud-based or personal computing system. The method 100 may include receiving 102 input materials of video, image, and audio. Multiple inputs may be permitted in multiple formats.

The method 100 further includes applying 104 an automatic video segment ranking algorithm effective to select the most important portions from all the input materials according to processing logic of the algorithm. Since each video segment may have both a video track and audio track, the method 100 may include ranking video segments according to algorithms that separately analyze one or both of a visual perspective or an auditory perspective, referred to herein as video-centric or audio-centric analysis, respectively. In some embodiments, an algorithm may identify important portions by simultaneously evaluating the visual and auditory content of a video segment.

In the video-centric ranking strategy, frames are decoded 106 from all video inputs and are put together. Then from each frame a feature vector is extracted 108. There are many types of feature vectors that can be used, and in one implementation a sparse-coding based feature vector is used. In this way, video frames are converted to a collection of feature vectors, each feature vector corresponding to one frame.

Next a clustering algorithm is applied 110. In particular, the clustering algorithm groups similar (i.e. having similar feature vectors) and temporally neighboring frames into the same cluster. The set of feature vectors in each cluster indicate that the video frames the feature vectors were extracted from belong to the each cluster. These corresponding video frames of a cluster are used to identify 112 a video segment corresponding to the cluster. For example, by assigning frames to clusters accordingly to temporal proximity and similarity of feature vectors, the algorithm breaks down videos into smaller segments, i.e. the consecutive frames of a video input assigned to a cluster define a video segment.

Next, video segments corresponding to each cluster are ranked 114 according to their importance, where importance is defined by the energy (e.g., mathematically based on variance) of each video segment. Next based on the duration of highlight required by the user, top ranked video segments are selected 116 and a highlight video is composed 118 based on the selected video segments. For example, if the user only wants a video highlight of 20% original video length, the algorithm will select 116 20% of the video segments that have the greatest energy and compose 118 a highlight video from these video segments.

In the audio-centric strategy, the audio track is extracted 120 from each received input. Automatic speech-recognition is then performed 122 to obtain a text transcript of the audio track. The text is then analyzed to identify 124 sentences (conceptually it like that we break down the video into smaller video segment). The importance of each sentence is then measured, such as by again using variance. In this way, we obtain a list of sentences is obtained with each sentence having an importance assigned thereto. Since the speech recognition step relates the start and end of each sentence to a position in the original audio track, each segment of the audio track corresponding to each sentence therefore has an importance assigned thereto. Likewise, the video segment corresponding to the audio segment may be assigned the importance of the sentence corresponding to the audio segment. Accordingly, based on the audio-centric importance score calculated at step 126, the video segments may be again ranked 128, the top ranked video segments selected 130, and a highlight video composed 132 based on the requested length of the highlight in the manner as for the video-centric approach.

Where the input materials include static images, the method 100 may include treating them as a special case of video, such that there are not separated criteria for video or image inputs. In the some implementations, each static image input is first converted into a video (e.g. having a length equal the average length of the video segments of step 112 obtained in the video-centric strategy). The video segment for each static image may then be treated like other video segments identified at step 112 with respect to ranking and selection for highlight composition.

Some implementations of the method 100 may permit the user to have multiple audio inputs including i) the original audio track in the video inputs; ii) a user specified audio file from a personal computer or elsewhere; and iii) a mix of the original audio from a video input with the specified audio.

Although a system implementing the method 100 may only requires the user to define the input videos and the duration of highlight to operate, the system may further permit the user to also define title, description, date, and other attributes of the generated highlight. If any of this information is provided to the system, the method 100 may include generating a customized poster frame and embed it as the first frame in the highlight.

Figure 2:
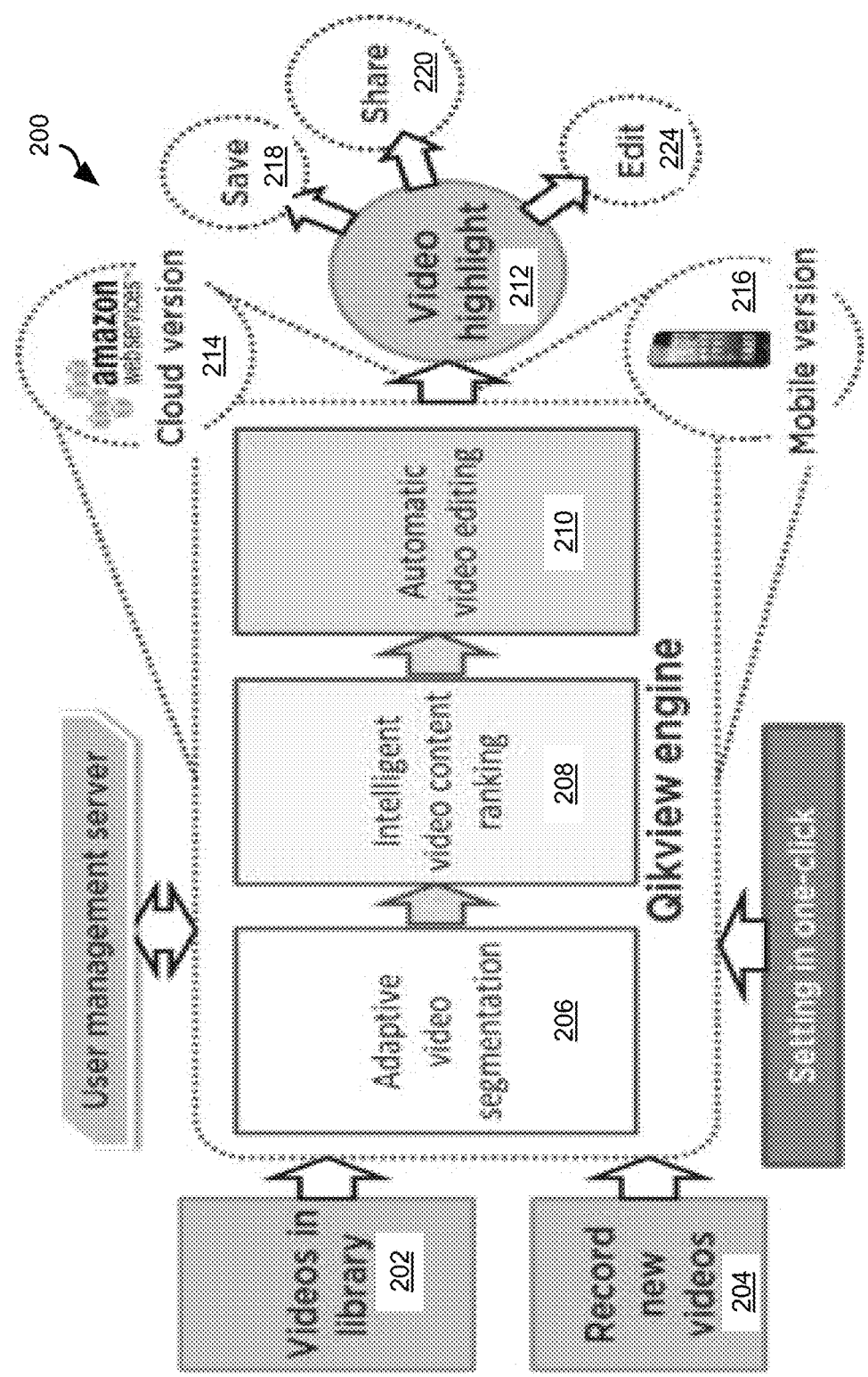
FIG. 2 is schematic block diagram of a components for automatically editing video in accordance with embodiments of the invention.

The system implementing the method 100 may be an entirely cloud-computing based platform, where a large number of users can upload original videos to the cloud simultaneously and generate highlights according to the method 100. Based on the number of users, the cloud will automatically expand/shrink its scale to efficiently process these tasks. When the cloud is processing highlights for more users, it will automatically launch more processing instances such that the overall scale of the cloud grows bigger. In another example, a cloud-computing based video editing system first requires the user to upload all video editing input materials to the system. Then the presented video editing cloud will allocate a processing node to handle the video editing tasks. In one example, in this processing node, the following detailed process may occur, and may include other steps, lesser steps, or alternative order of steps:

Referring to FIG. 2, the illustrated network system 200 may be used to implement the method 100 and other methods disclosed herein. Inputs to the system may include videos 202 in a video library or newly recorded videos 204, such as recorded using a smart phone, action camera, hand held video recorder, or the like.

An adaptive video segmentation module 206 may divide the video into segments, such as by performing steps 106-112 and/or steps 120-124 of the method 100. An intelligent video content ranking module 208 may identify the most important video segments, such as according to steps 114 and/or 126-128 of the method 100. The segments identified by the intelligent video content ranking module 208 may then be edited into a highlight video 212 by an automatic video-editing module 210.

Various actions may be invoked with respect to the highlight video 212. For example, a user may instruct the system 200 to save 218, share 220, or edit 224 the highlight video 212.

As is apparent in FIG. 2, the system 200 may be implemented on a cloud-computing platform 214 (e.g. AMAZON WEB SERVICES) or on a mobile device 216. The system 200 may also be implemented by a desktop, laptop, tablet, or wearable computing device.

The system may define other interfaces, such as an interface 226 enabling management of user accounts and an interface 228 for managing settings, such as a one-click invocation of the video editing process.

Figure 3:
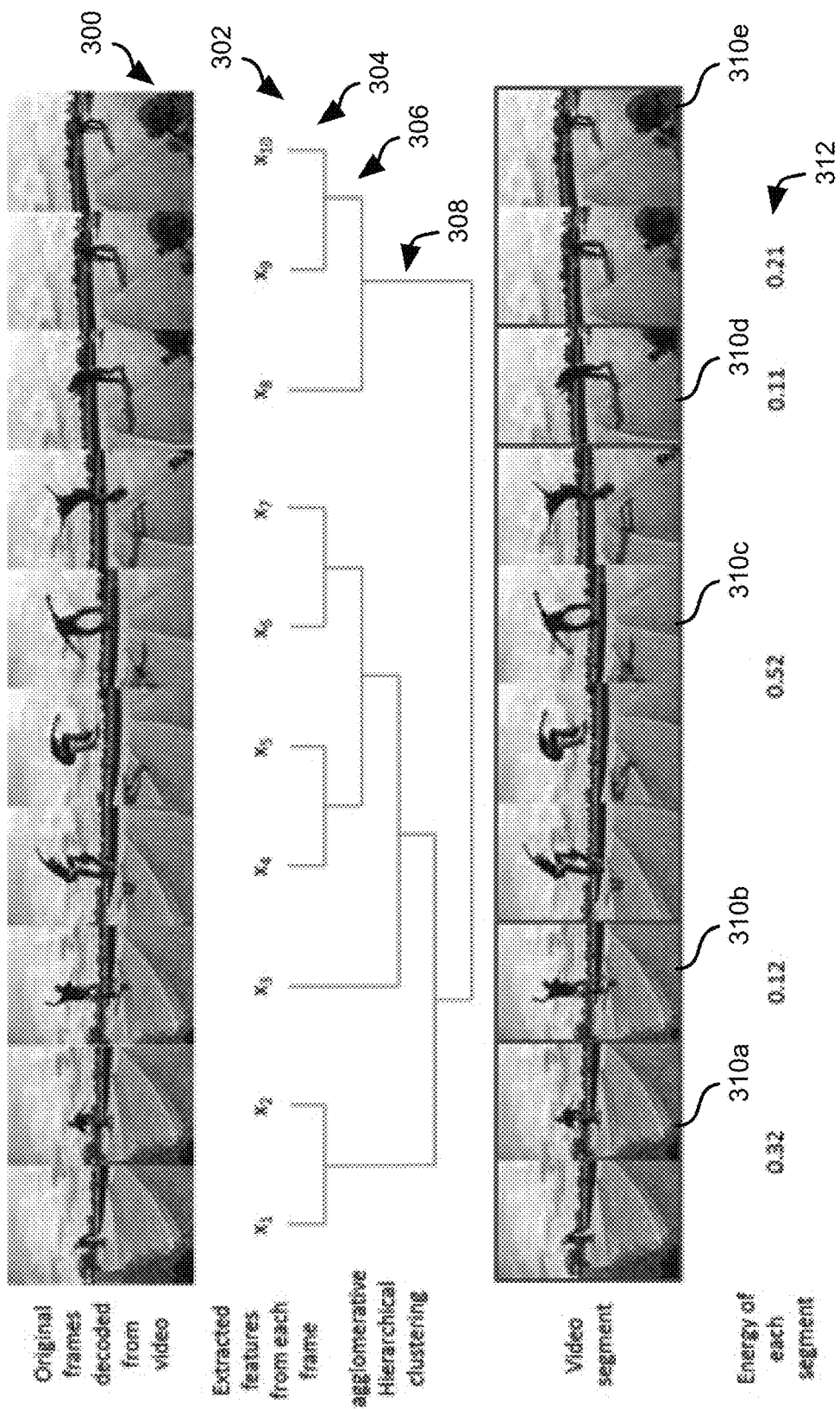
FIG. 3 is a set of frames illustrating the identification of features and energy in a video segment in accordance with an embodiment of the present invention.

FIG. 3 illustrates an example application of the method 100 to a video segment including the illustrated frames. As described above, the format of each input may be analyzed; in particular its format (video, image) is evaluated. Each input that is found to be an image is converted into a short video of defined length (e.g. 10 seconds or some other length, such as described above). This is done by generating a video that simply includes repeated frames including the input image. All the video inputs (including those converted from an image) are then sent to the adaptive video segmentation module 206 and intelligent video content ranking module 208 for segmentation and ranking.

Referring specifically to FIG. 3, the ranking algorithm may be understood as proceeding form top to bottom of the figure. First the original video segment 300 is divided into segments 302 (e.g. according to clustering step 110 described above) and the importance (e.g. energy) of each segment is calculated, such as based on variance as described above. In the illustrated embodiment, the frames X1 to X10 are clustered in a hierarchical manner. For example, at one level 302, clusters (X1, X2), (X4, X5), (X6, X7), and (X9, X10) are identified. These clusters may then be combined into larger clusters at a different level 304. For example, at level 304, clusters ((X4, X5), (X6, X7)) and (X8, (X9, X10)) are defined. At another level 306, a cluster (X3, ((X4, X5), (X6, X7))). At another level 308, a cluster ((X1, X2), (X3, ((X4, X5), (X6, X7)))) is defined. The generation of clusters from frames or sub-clusters may be performed in the same manner, i.e. base on similarities of feature vectors of the frames of the clusters. Similarities to clusters to one another or to an individual frame may be identified by evaluating individual feature vectors of the cluster or by evaluating a combination (e.g. aggregate or average) of the feature vectors in the cluster. Video segments may be identified according to the clusters at one or more levels 302-308 and the segments may be ranked according to importance, such as in the manner described above.

In some embodiments, the clustering and ranking is performed using the video-centric strategy as a default. However, a user may also instruct the system 200 to rank segments based on audio-centric strategy. In either case, the output of the ranking results will be a list of video segments and their corresponding importance.

For example, the importance of video segments may be determined based on energy (e.g. variance) within each video segment. For example, the original video segment may be divided into segments 310*a*-310*e* based on the clusters at level 306 or below: segment 310*a* (X1, X2), segment 310*b* (X3), segment 310*c* ((X4, X5), (X6, X7)), segment 310*d* (X8), and segment 310*e* (X8, (X9, X10)). The energy scores 312 of each segment 310*a*-310*d* may were calculated as 0.32, 0.12, 0.52, 0.11, and 0.21, respectively, in the illustrated example.

Based on requested duration of the highlight, top ranked video segments are selected. In case the specified duration is longer than the entire input videos, all videos will be just merged into the highlight. In some implementations, the user will be required to specify the duration of highlight as a percentage number, e.g., 20%, and may be required to specify a percentage that is less than 100%.

The selected segments may be composed into a highlight video by first extracting the selected segments from the original videos into a physical video file. Then these video segments are concatenated with a third-party video-processing library (ffmpeg in our implementation). Where multiple videos are input, transition effects may be placed between the segments of different videos.

Figure 4:
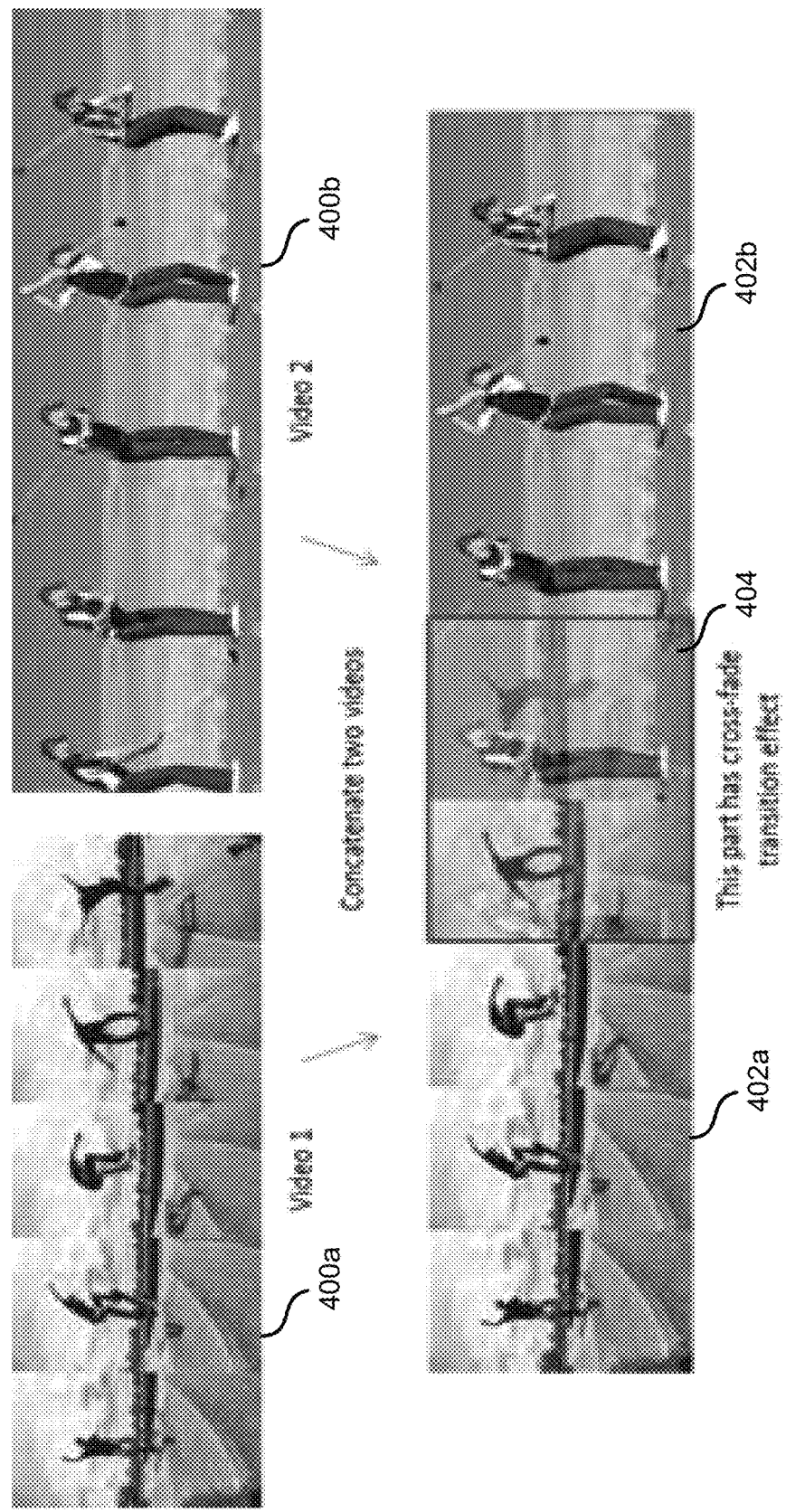
FIG. 4 is a set of frames from a pair of video segments showing the automatic splicing of segments with transition effects in accordance with an embodiment of the present invention.

For example, referring to FIG. 4, the illustrated example shows the concatenation of video segments from different videos with a cross-fade transition. Specifically, segments 400*a*, 400*b* may be selected from different videos based on importance using the methods disclosed herein. The segments 400*a*, 400*b* may then be concatenated into a video including a segment 402*a* including a portion of the segment 400*a* and a segment 402*b* including a portion of the segment 400*b*, and a cross-fade portion 404 including cross fading of an end portion of segment 400*a* and a beginning portion of segment 400*b*. Any other transition effect known in the art may be used to transition between segments of different videos or between segments of the same video.

The order of the segments concatenated in the highlight video may be the same as the chronological order of the segments in the original video. For instance, segment from 00:05:00-00:06:00 will be put before segment from 00:08:00-00:09:00 in the final highlight. In other examples, the segments may be mixed up for effect.

The generated video highlight may then be stored in the cloud. In some embodiments, a provided web service will return a URL referencing the video highlight to the user. The user can playback the URL directly on a personal computing device device. For example, the cloud may implement video streaming. In other implementations, a media file including the video highlight may be transmitted directly to the user's personal computing device.

Figure 5:
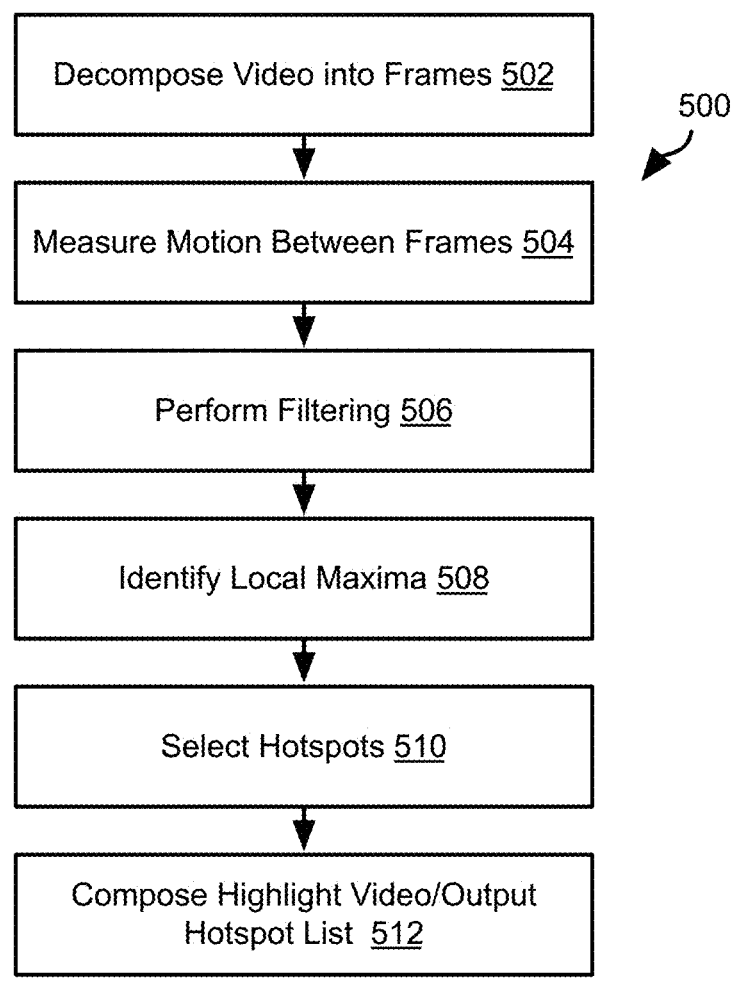
FIG. 5 is a process flow diagram of a method for identifying hotspots in a video in accordance with an embodiment of the present invention.

Referring to FIG. 5, videos may contain interesting portions and uninteresting portions, and judgments may be made during editing to cut out certain content to either shorten a video presentation or simply make it interesting to a viewer. Interesting portions of a video may be characterized as "hot spots," indicating a certain likability to the content by a viewer or group. Given the large amount of videos produced every day, the capacity to identify hot spot in video is highly desired. The definition of what is hot/interesting in a video may be subjective, which caused challenges on 1) choosing which features could be extracted from video for identifying hot spot, and 2) what types of classifications methods could be used to determine hot spots, such as identifying portions that may be exciting, boring, interesting, titillating, or otherwise "hot" to a viewer or group of viewers.

These judgments may be made according to a certain aged group, gender, cultural, or other viewer characteristic. Video usually only records the visual and auditory content of an event, and there typically is no additional data stream that records subjective judgments of "hotness" and where they exist in the video. Some existing devices use a manual button for the user to click when something hot happens. Other devices try to analyze accelerometer data to understand the user movement to identify hotness—here, a device needs to be robust enough to distinguish between movement that indicates an interesting event happening or other activity, such as for example a hand shake. These approaches require additional sensors or devices, are limited to application scenario, and often require active user intervention.

Since the hotness in video is subjective, companies like GoPro use a manual process to allow the user to log interesting moment in addition to recoding the video. On the other side, since the hotness in an event may cause certain user movement, such as fast and long range hand action, by analyzing the accelerometer may also come to a cue that can be used to identify hotness in a video. ANTIXAPP is a company using an approach where its app running on an Android device attached to a camera can output instances in hot spots in the camera video. This approach assumes a strong connection between an accelerometer reading and hotness, which may or may not be accurate. In any event, if the user is under water or in other situations where users move in ways particular to their environment, the approach would fail.

Hence it is desirable for a new approach to directly identify hot spots from existing streams in video that is also robust and accurate. As will be seen, such an approach is provided herein.

Provided is an approach to automatically identifying hot spots in videos. In one example, a process comprises a video decoding process to decompose video into consecutive frames, to calculate the motion flow between every neighboring frame, and to obtain a set of hot spot from the video based on analyzing the motions with a proposed algorithm. The method can be applied to different types of videos such as UGC, GoPro footage or professional videos. The identified hot spot in the video can be used for summarization, indexing, search, browsing and recommendation.

In particular, the methods disclosed herein enables identifying hot spot direct from visual content without the user of other devices or sensors. Hence the method 500 can be used to process existing video as well as live videos. The methods disclosed herein may further be applied to many type of videos without regard to the environment where the video is recorded. The methods disclosed herein further enable the use of the obtained hot spot for video summarization, indexing, search, browsing and recommendations.

Referring specifically to FIG. 5, the illustrated method 500 may include decomposing 502 a video into frames. Once the video is decomposed into frames, the motions between neighboring frames may be measured 502 with algorithms. Those skilled in the art will understand that there are existing algorithms for performing this task. For example step 504 may include calculating the optical flow between frames. The measured motion (e.g. optical flow) may then be filtered 506. Local maxima in the filtered motion may then be identified 508 and the segments of video corresponding to the local maxima may be selected 510 as hotspots. The hotspot segments may then be composed 512 into a highlight video.

Figure 6A:
FIGS. 6A to 6C are frames highlighted to show the identification of optical flow in accordance with an embodiment of the present invention.
Figure 6B:
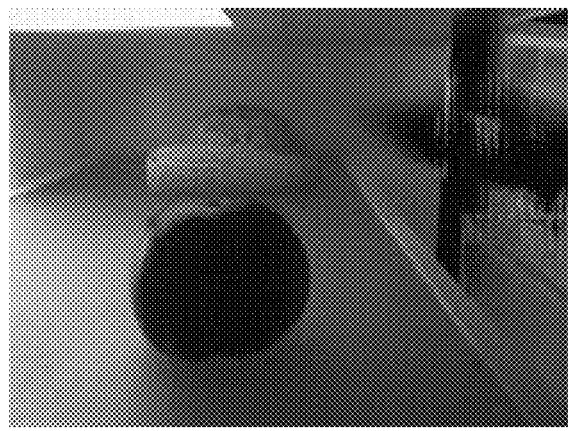
Figure 6C:
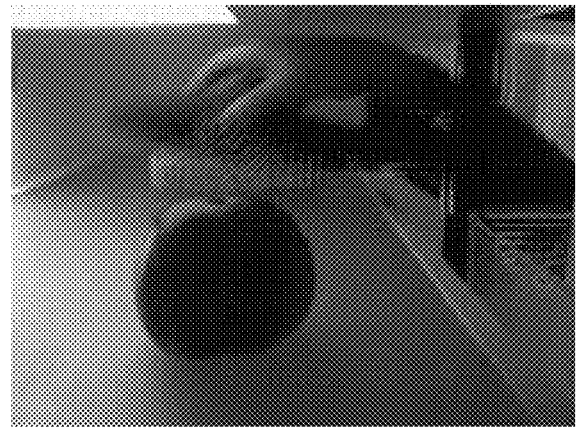

FIGS. 6A through 6C illustrate the calculation of optical flow that may be performed at step 504. As is apparent from FIGS. 6A through 6C, the hand movement may be accurately identified by calculating a dense optical flow, i.e., the movement of every pixel between neighboring frames. In one example, the optical flow is calculated using the Lucas-Kanade method. In the example of FIGS. 6A through 6C, the optical flow of each frame relative to a preceding frame is highlighted in green.

Filtering may be performed 506 based on an orientation of the pixel-wise optical flow to obtain a global motion pattern between neighboring frames. In one example, the average motion intensity (i.e., the average length of the motion vector at a pixel) may be obtained. In some embodiments, to smooth the result, a majority voting strategy may be applied to smooth the average motion, thus obtaining more stable and robust output. Filtering may further include averaging the optical flow among multiple frames, e.g. the filtered optical flow of one frame may be averaged with the filtered optical flow of one or more consecutive frames or the optical flows of a set of consecutive frames may be averaged without averaging individual frames.

In some embodiments, filtering may include summing the optical flow of each frame (such as calculated using the Lucas-Kanade method) and then average the summed optical flows of a set of consecutive frames to obtain an average optical flow for the set of consecutive frames.

Filtering 506 is helpful since the frame-wise optical flow is typically not stable. For example, a hand shake may generate large motion that occurs over a short amount of time. Accordingly, the frame-wise optical flow may be smoothed out by performing averaging over a group of frames, for example over every 100 frames. In this way, the following curves may be obtained.

Figure 7:
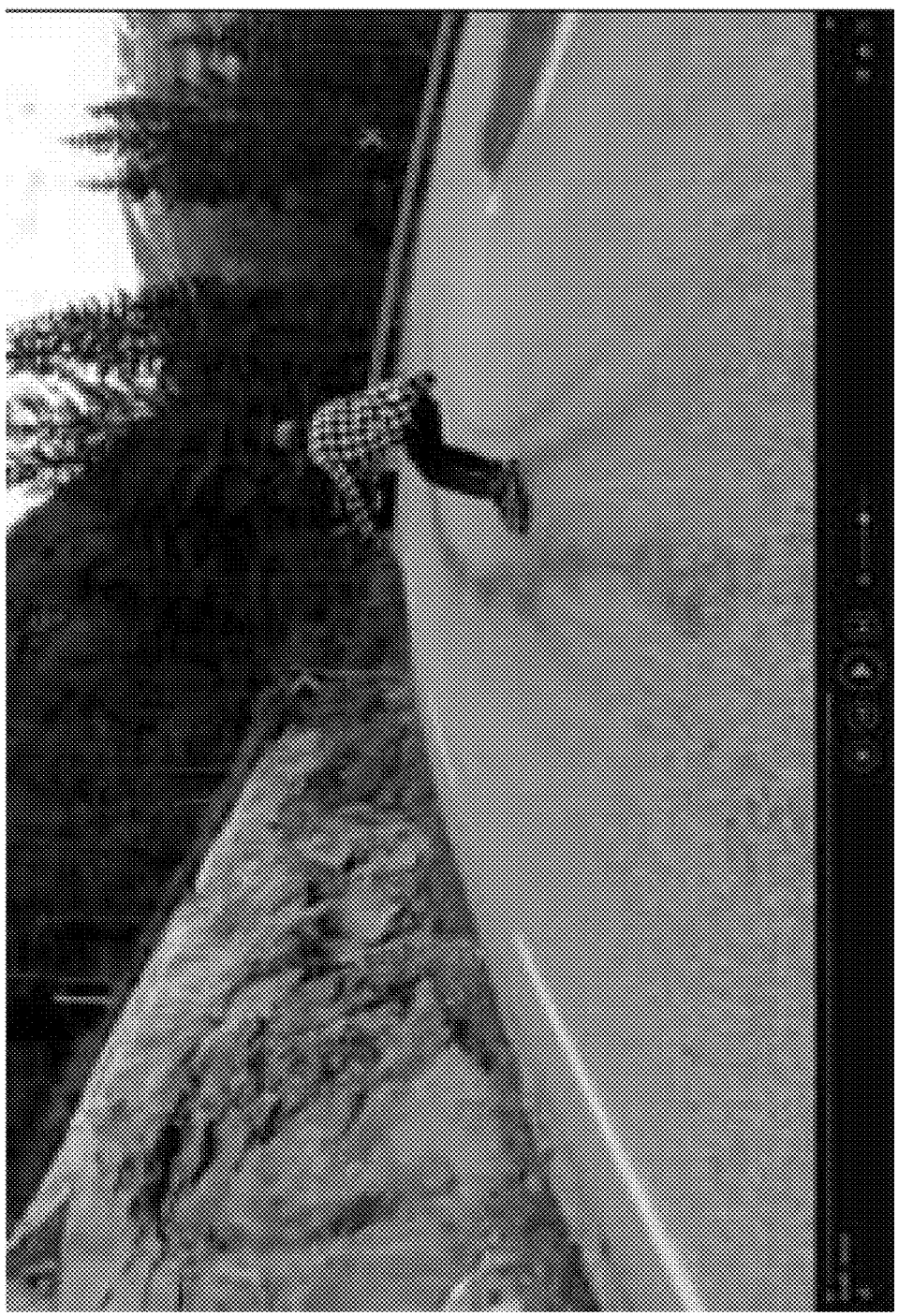
FIG. 7 is an exemplary frame from a video sequence shot using an action camera.
Figure 8:
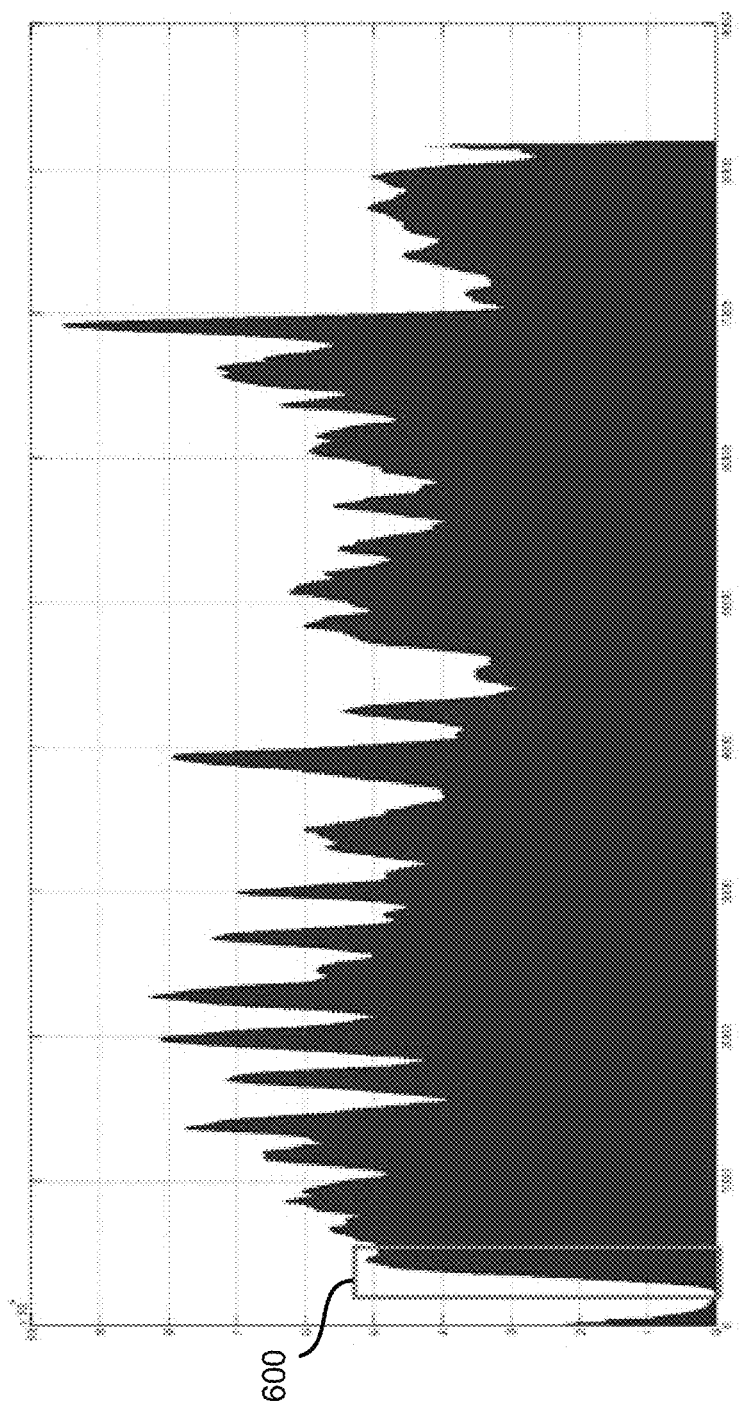
FIG. 8 is a plot of the optical flow magnitude of the frames of the video sequence of FIG. 7.

For example, FIG. 7 is a representative frame of a person skateboarding and being filmed by another person in a moving vehicle, resulting in motion both of the camera and in the field of view of the camera. The smoothed optical flow (100 frame average) for this video is shown in FIG. 8.

The portion preceding the rectangle 600 at the beginning of the plot corresponds to preparing the camera to capture video of the subject (the skate boarder). The portion of the plot in the rectangle 600 shows that as the subject started to move after frame 100, the motion (as indicated by the average optical flow) starts to increase. Most of the subsequent peaks also correspond to when the subject was making an action, so the operator of the camera tries to catch up with him. In this way, each motion peak may be estimated with high probability to be a hot spot.

Figure 9:
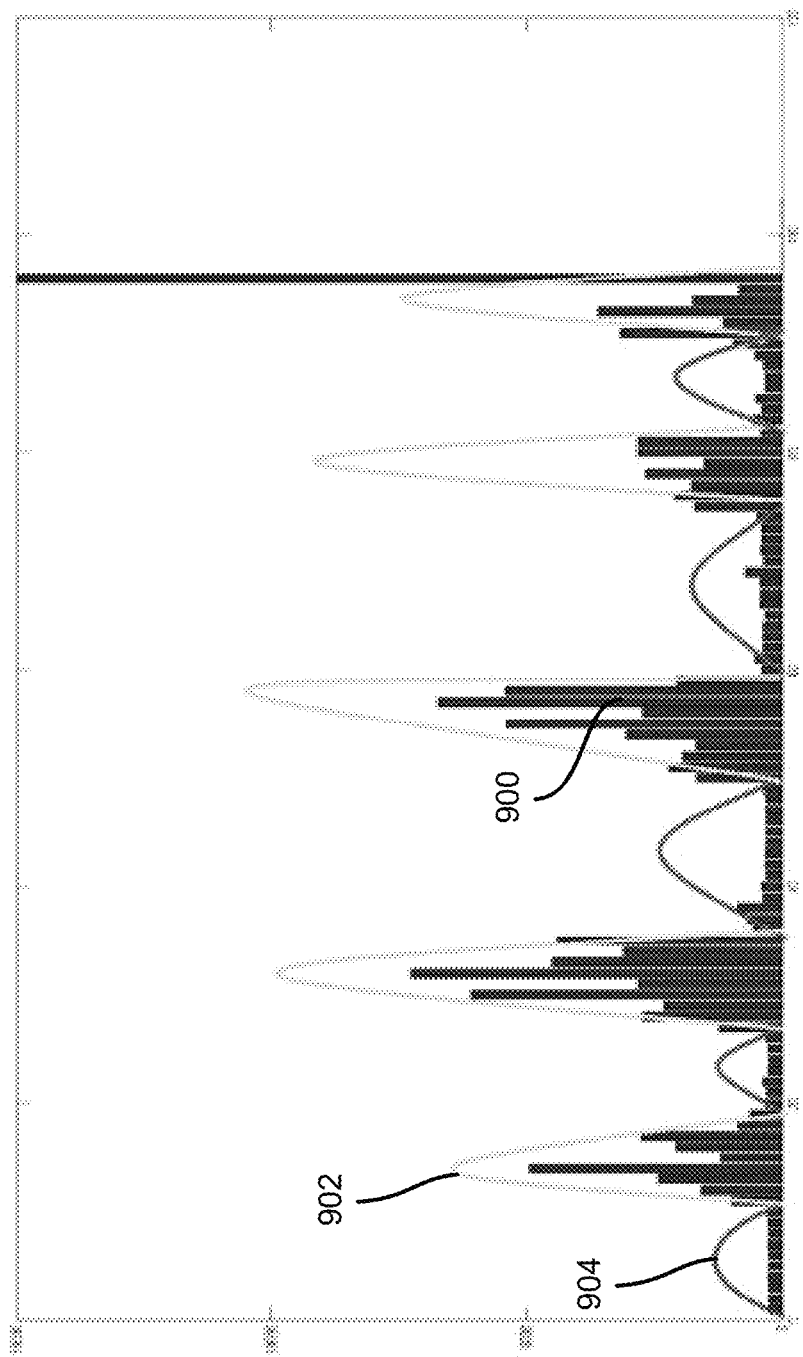
FIG. 9 is a plot used to automatically identify hotspots in the video sequence of FIG. 5 in accordance with an embodiment of the present invention.

For example, referring to FIG. 9, the plot 900 may represent the optical flow of a video segment without filtering. The plot 902 may represent an envelope of the optical flow after filtering 506. The local maxima in the plot 902 may be identified as hotspots and selected 510 for inclusion in a highlight video. For example, the center of each local maximum may be selected as a hotspot. A portion of the video extending before and after the center may be selected as a hotspot video segment. The portions of the plot 900 covered by plot 904 may correspond to non-hotspot, e.g. boring, portions of the video and may be omitted from the highlight video.

In some embodiments, only hotspot identification is performed, rather than generation 512 of a highlight video. Accordingly, step 512 may include outputting the time point in the video corresponding to each local maximum, or the center of each local maximum. For example, step 512 may output a list of times or a list of links that invoke each invoke playback at the location of one of the local maxima identified at step 508.

Figure 10:
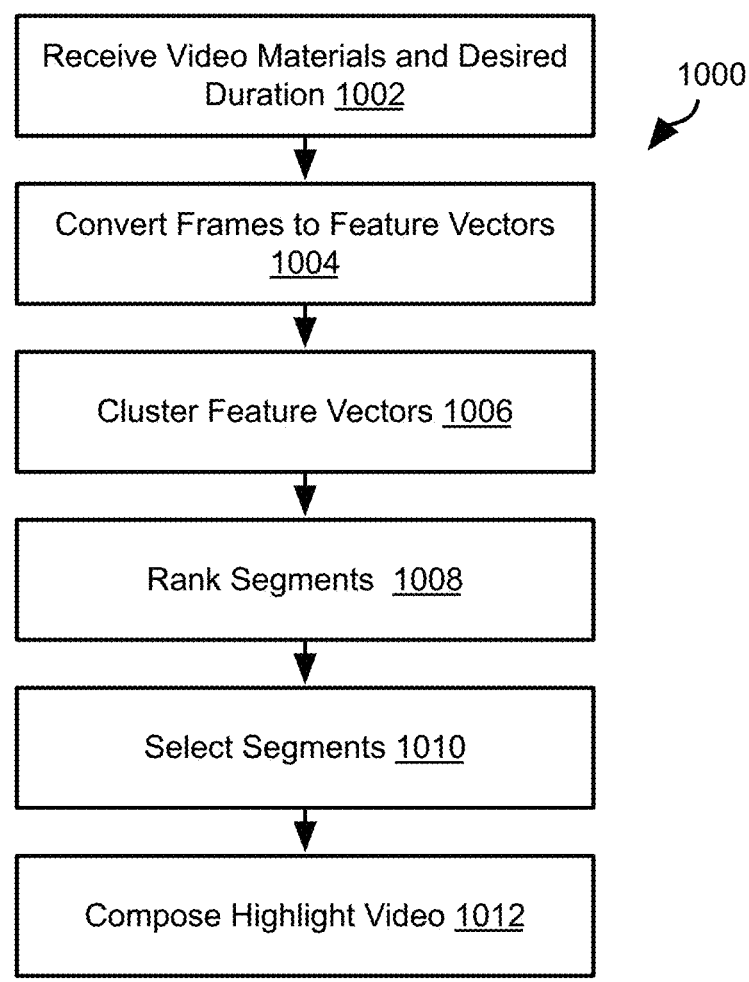
FIG. 10 is a process flow diagram of a method for composing a highlight video fore video segment in accordance with an embodiment of the present invention.

Referring to FIG. 10, video editing for an amateur user has always been a challenging task, because the process requires a skilled camera operator to provide high-quality video editing material, a skilled movie director to rank and select meaningful and important video portion from the materials to compose a story, and a skilled video editor that knows how to apply video transition, video filtering, video/audio synchronization, etc. tasks to implement the director's selection in the final cut. There are some existing applications for use in either a desktop or mobile environment, but they have shortcomings that make their use difficult and inadequate for a user. Such applications provide interfaces to allow the user to perform certain operations, but amateur users usually have difficulty understanding how to operate such applications. In addition, when editing videos on a mobile device, the physical screen size limits the type of interactions the user can perform for video editing.

Referring to FIG. 10, the systems and methods disclosed herein provide an approach to automatically generating video highlight with minimal user intervention. The system and method is based on using an intelligent computer software and algorithm to automate the role of a camera operator, a director, and an editor for the video production process. Users of the system and method only need to specify the set of video materials and specify the duration of the highlight to be generated. The rest of the video content analysis, video selection, and video editing are all automatically done by the system and method, in this way a one-click video highlight generation process is provided. The workflow is largely different from existing video editing applications, where complicated video selection, video editing effect setting, and video composition parameters tuning are required to generate a video highlight. These advantages make the technique very suitable for mobile applications and for amateur use.

In one example, an automatic mobile video editing system performs a method 1000 that includes receiving 1002 from the user video materials and a desired duration of the video highlight to be generated. No further information is required in order for the algorithm to automatically generate a highlight video. The system performs the rest operations, thus allowing a one-click video highlight generation process.

The system may be implemented on a mobile device, thus avoiding the use of any backend system where otherwise the user has to wait until his specified video materials get uploaded to the backend, which results in very poor video editing experience. Also the one-click operation makes the video highlight generation task accessible for every user, skilled video editing user or amateur user.

In one implementation, the system executing the method 1000 of may receive 1002 the user selection of videos in an interface page that presents a set of videos and receives a user selection from among the set of videos. The duration may be received 1002 by providing a slider that a user may adjust in order to specify the desired duration.

The method 1000 may further include executing a video frame representation algorithm that converts 1004 the color values (RGB values) of each frame into a feature vector. The method 1000 may further include executing a vector-clustering algorithm that groups 1006 similar vectors in the same cluster. Since the clustering algorithm also considers the temporal order of frames, each cluster of frames will become a short video segment. An example of a clustering algorithm is described below with respect to FIGS. 11 and 12.

The method 1000 further includes applying 1008 an automatic video or audio content ranking algorithm to select the most important segments from among the video segments corresponding to each cluster. Based on the requested duration of the highlight, top ranked video segments are selected 1010. For details of how ranking of the segments for each cluster may be performed see the algorithm described below with respect to FIGS. 11 and 12.

The system next performs 1012 automatic video editing by concatenating the segment together with transition effect, video filtering and audio track. Specifically, video segments are firstly extracted from the original videos. Then with the original temporal order (i.e., an earlier segment in the original video will also appear earlier in the highlight), the video-editing module will concatenate video segments by using off-the-shelf video editing libraries (ffmpeg in our mobile app). Every neighboring segment may be be concatenated with one seconds overlap (the last second of the first segment will overlap the first second of the second video), and during this overlapped 1 second, there will be video transition. Once all video segments are concatenated, then video filtering may be applied by adding themes as another layer over the concatenated video. Finally, the audio track in the concatenated video may be replaced by a user-specified music or other audio file. If the specified audio file is longer than the concatenated video, the audio file will be cut to match the video duration. Finally video resulting from this process then becomes the highlight video and is output to a user or made accessible from a cloud storage system as described above.

As for the method 100, the method 1000 may include treating static image as a special case of video, such that there are no separated criteria for video or image inputs. In one example, each static image input is firstly converted into a fixed duration video of static frames, such that the video selection algorithm can also apply for ranking image, such as according to the ranking algorithm described below with respect to FIGS. 11 and 12.

The illustrated method 1000 may be implemented as a mobile-based platform or a cloud-based system, where the later could process a large number of concurrent video editing tasks. The cloud and the mobile application-based version may have different operation systems and such that the video-processing library (the ffmpeg library in our case) gives slightly different video decoding results. This will affect the frame representation process, and may therefore affect the video ranking and highlight generation results.

Figure 11:
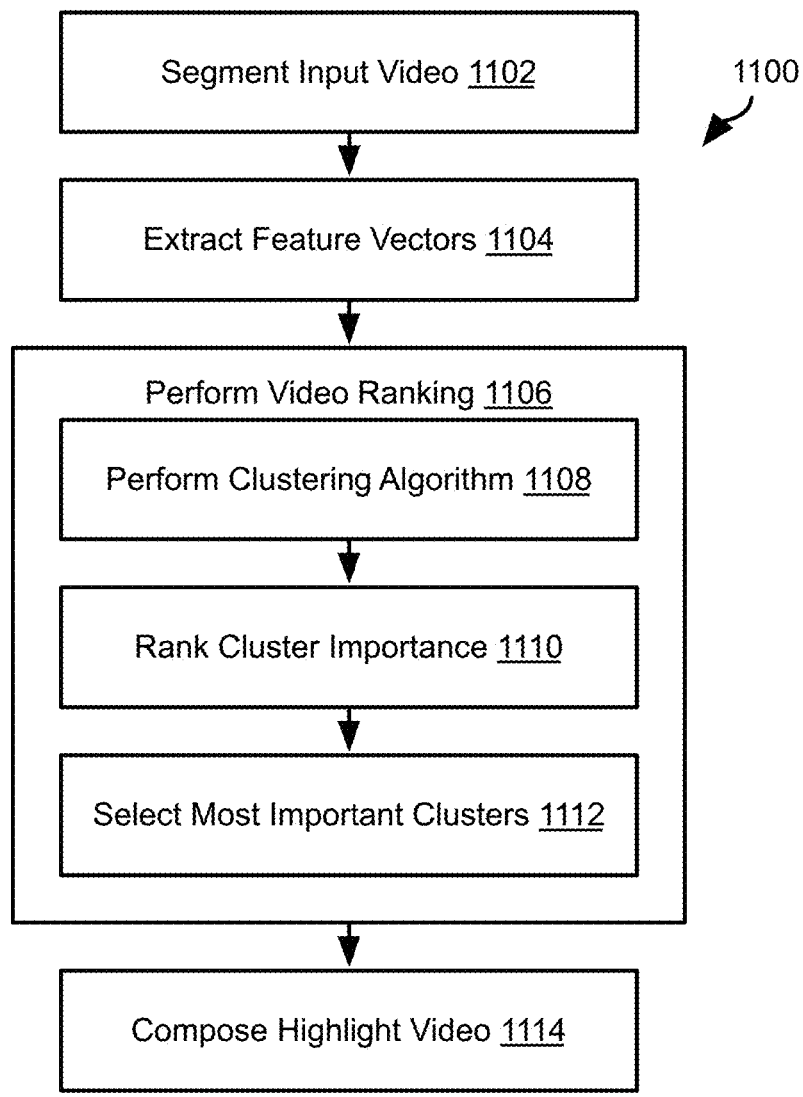
FIG. 11 is a process flow diagram of a method for ranking segments in accordance with an embodiment of the present invention.

Referring to FIG. 11, ranking videos may be performed using two processing steps: 1) converting the dynamic information in video into a feature representation, and 2) ranking the videos based on their feature representation for the purpose of subset video selection. For the first problem, many existing works rely on simple static image representation of dynamic video content, e.g., a video frame, which significantly loses the rich dynamic information in the video. Furthermore, to convert the static image into a feature representation, some existing works only use very simple feature where additional information loss occurs. For the second problem, many existing algorithms require solving a global optimal factorization task of the entire video feature space to find a ranking of each video segment, which is slow and requires huge memory for calculation.

The systems and methods disclosed herein provide a more efficient video representation and a faster segment ranking algorithms based on the representation.

A video abstract is a compact representation of a video and is useful for various video applications. For instance, it provides a quick overview of the video database content, enables fast access to shots, episodes and entire programs in video browsing and retrieval systems. There are two basic forms of a video abstract:

1) A preview sequence, being the concatenation of a limited number of selected video segments, and 2) a set of key frames, being a collection of suitably chosen frames of a video.

2) A preview sequence is made with the objective of reducing a long video into a short sequence that is often used to help the user to determine if a video program is worth viewing in its entirety.

Key frames are most suitable for content-based video browsing, where they can be used to guide a user to locate specific video segments of interest. Furthermore, key frames are also effective in representing visual content of a video sequence for retrieval purposes: video indexes may be constructed based on visual features of key frames, and queries may be directed at key frames using image retrieval techniques.

The systems and methods disclosed herein provide an improved approach that addresses how to rank multiple video clips, so that a subset clips can be selected based on the obtained ranking to compose an abstract of the entire video clip collection.

For example, an example approach may include segmenting an input video into multiple short video clips, applying a ranking algorithm to find the most important video clips, and finally to concatenate these top-ranked video clips to compose an abstract. The algorithm can also be used in other situations where video ranking is required, e.g., given a collection of videos identify the most important ones can be selected to compose a video skim.

The approach disclosed herein may represent an input video in two ways. Specifically, a video representation algorithm, which may be a generic visual feature representation algorithm that identifies, from a video, either a set of static images (called frame representation) or a set of short image sequences (called clip representation). In this way, the proposed algorithm can also be used for ranking images (where one treats images as a special case of video). Accordingly, the method 1100 may include generating 1102 a video representation of an input video, either a frame representation or a clip representation.

pixel's color value into an index, and then a histogram can be constructed based on the frequency of each index value. For example, denoting the color value for a pixel as x (x can be a scalar or a D-dimensional vector where D is the number of color channels), and all pixels from the frame as $X=\{x1, x2, \ldots, xN\}$. We quantize them into a 256 bins. In this way, the frequency if each bin index depends on how many x are quantized into the corresponding bin, and one could obtain a feature vector of 256-dimensional to represent the frame.

In a more general case, one could define the collection of bin centers as a codebook (B), and regard vector quantization as a special case of the more general Sparse-coding process. Similarly, X can be the collection of color value, but can also be other type of description of the pixel (such as SIFT (scale-invariant feature transform) descriptor). With such more general notation, the vector quantization process is to solve the equation in Table 1, row 1, to calculate the quantized index (codeword index in the codebook). In fact, in Sparse-coding there is another way of solving the index, as illustrated in Table 1, row 2, where C is the corresponding codeword index for X. Now, C is used to represent the frame, instead of X. In this way, the feature vector representation may be obtained for each video frame. The foregoing description of the feature vector extraction process may be used in any of the prior-described methods that generate feature vectors for frames of a video.

TABLE 1

Feature Vector Generation

| Method | Objective function | Complexity[1] |
|---|---|---|
| VQ [14], [11] | $C^* = \arg\min_c \|X - BC\|^2$<br>s.i. $\|c_i\|_{l^0} = 1, 1^T c_i = 1, c_i \geq 0, \forall i$ | $O(n)$ |
| ScSPM [17] | $C^* = \arg\min_c \|X - BC\|^2 + \lambda \Sigma_{i=1}^N \|c_i\|_1$ | $O(n^2)$ |
| LCC [18] | $C^* = \arg\min_c \|X - BX\|^2 + \lambda \Sigma_{i=1}^N \|d_i \odot c_i\|_1$<br>where $d_i(j) = \|b_j - x_i\|^2$ and $\odot$ denote element-product | $O(n^2 + n)$ |
| LLC [19] | $C^* = \arg\min_c \|X - BC\|^2 + \lambda \Sigma_{i=1}^N \|d_i \odot c_i\|^2$<br>s.t. $1^T c_i = 1, \forall i$<br>where $d_i(j) = \exp(-\|b_j - x_i\|^2/\sigma^2)$ | $O(n + k + \log(n))$ |

The method 1100 may further include extracting 1104 feature vectors from the video representation. For example, each frame or clip may be evaluated and a feature vector extracted for each frame or clip of the video representation.

The method 1100 may further include performing 1106 video ranking. Performing 1106 video ranking may include executing an efficient algorithm that sequentially selects the top ranked video segments. The ranking does not require storage of all feature representation in memory hence it is suitable for large video file. Also the algorithm performs selection sequentially until a certain stopping criterion is met. For example, the lengths of selected video segments add up to a specified threshold. In this way, only partial ranking is required for the total video segments, and hence it is much more efficient.

For frame representation, each decoded frame is a matrix of pixels having a width×height (e.g., 352×288), and each pixel has a color value in a defined color space (e.g., RGB or YUV). The frame representation may be converted into another type of representation with a certain level of abstraction. Usually the new representation is called an image feature vector that is more suitable for computer algorithm to process. In some implementations, a histogram-like feature vector is extracted 1104 from each frame.

In the simplest case, such histogram-like feature can be simple obtained by performing vector quantization of each A similar approach for feature vector extraction may be applied to a video clip, where the clip representation is used. For example, the feature vector for a short window of frames may be extracted at the same time, e.g. in the same manner as for an individual frame. There is no major difference from representing one single frame as opposed to a set of multiple frames. The only difference is that now the collection X contains x from pixels in all the stated frames. With the same codebook B, the Sparse-coding algorithms in the Table 1 may still be applied to convert X into C.

Referring again to FIG. 11, for video ranking based on the obtained frame representation, we first perform 1108 a clustering algorithm to group neighboring frames' feature vectors into a cluster. Then the importance of each cluster may be ranked 1110, and the most important clusters may be selected 1112 as the output of the ranking 1106. The selection process 1112 continues until the video segments corresponding to the selected clusters add up to a required duration. In one implementation, the following algorithm performs importance ranking and selection in a sequentially way:

1. Define the set of clusters (corresponding to small video segments, such as according to the cluster generation approach described above) as $C=\{C1, C2, \ldots, CN\}$, we first calculate the mean $C^*=\text{AVERAGE}(C)$. Each value C1, C2, ..., CN may be a function of the feature vectors of the frames in each cluster, e.g. an average or sum of the feature vectors.

2. Define the selection set S as an empty set, i.e., S={ }, at the beginning of the ranking and selection process.
3. For i in all the segments i=1 to N, find i* where $\|Ci^*-C^*\|^2$ is the greatest for all i=1 to N, i.e., find a cluster that is the most different from the mean C*.
4. Select i* into the selection set S by setting S={i*}. Define $T=\|Ci^*-C^*\|^2$
5. For i in all the unselected segments, denoted as i in 1 to N, i not in S, find i' where $\|Ci'-C^*\|^2$ is the greatest in all i, and for any j in the selected segments set S, the new selection i' has to be very different from any existing selection. To determine that, the condition $\|Ci'-Cj\|^2>T$ is evaluated with respect to the segments j in S. If this condition is satisfied for all segments j in S, i' is added into S. If the condition $\|Ci'-Cj\|^2>T$ is such that no other i' could be found, the condition is relaxed by decreasing the threshold, e.g. T=T*0.8 and step 5 is repeated. If the condition is met, then the algorithm proceeds to step 6.
6. If the lengths of the segments added to S add up to a required length, stop. Otherwise step 5 is repeated.

Figure 12:
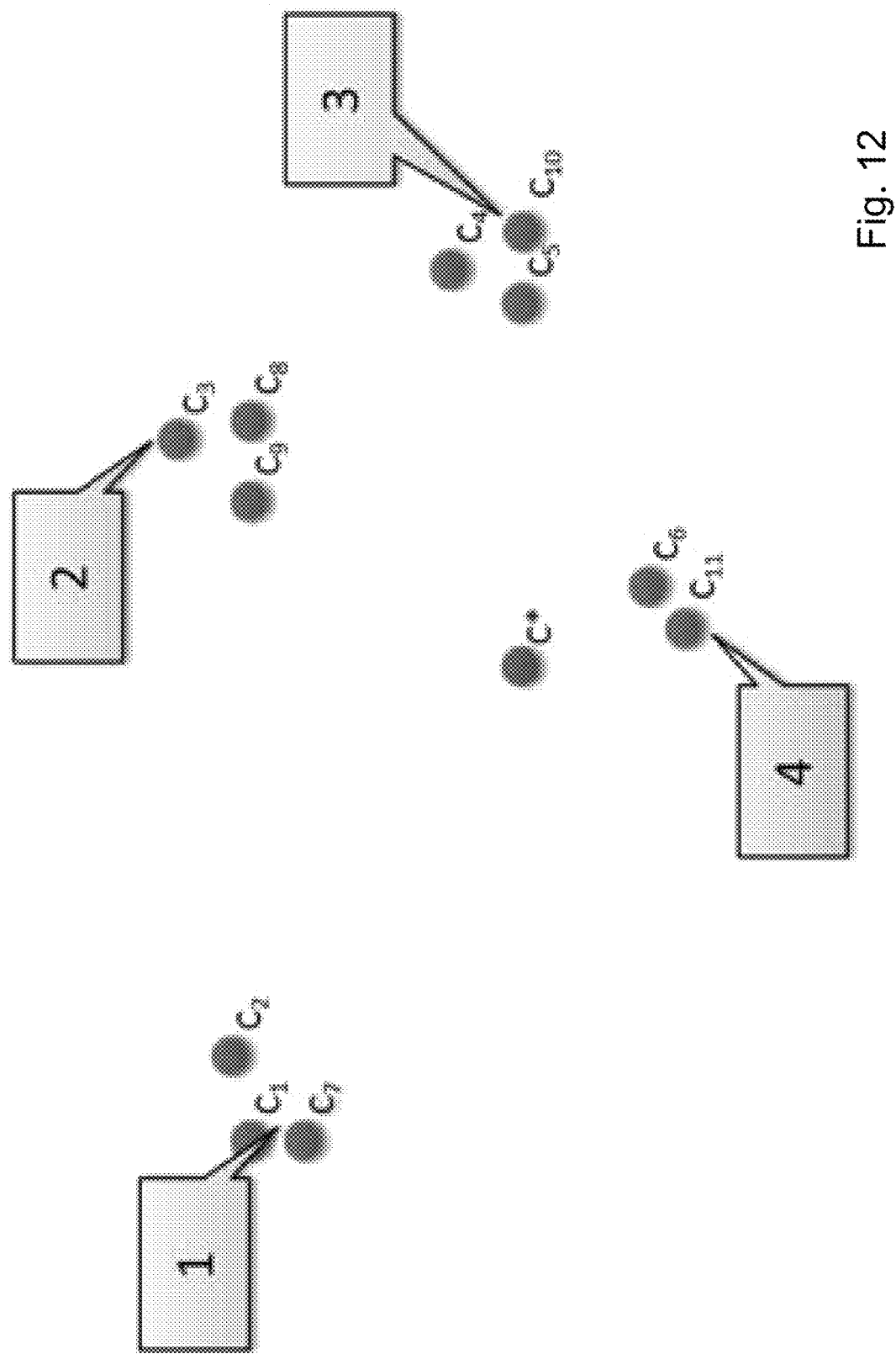
FIG. 12 is diagram illustrating the selection of clips from clusters of clips in accordance with an embodiment of the present invention.

Referring to FIG. 12, the algorithm described above may sequentially select clusters C1, C3, C10 and C11. In particular, cluster C1 is farthest form C*, C3 is farthest from C1 and from C*, C4 is farthest from C* and from C1 and C3, and C11 is farthest from C* and from C1, C3, and C4.

Once the selection stops, the obtained set S records all the selected segments. It is the output of the visual content ranking process. This set of segments may then be used according to any of the methods described above. For example, video segments identified by the set S may be composed 1114 into a highlight video according to any of the methods described above.

Although the present disclosure is described in terms of certain specific embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

Figure 13:
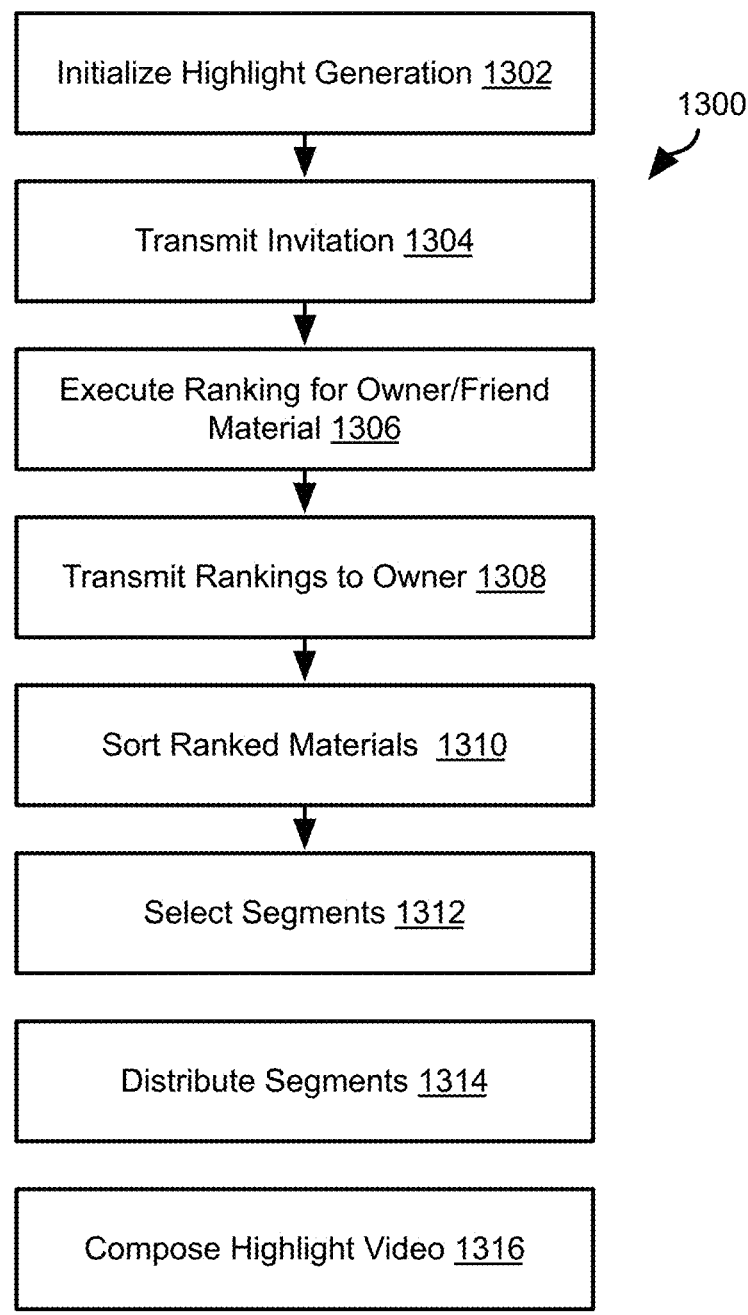
FIG. 13 is a process flow diagram illustrating the generation of video highlights using social collaboration in accordance with an embodiment of the present invention.

Referring to FIG. 13, video, photo and audio content may exist on different user's mobile devices. Although each of the users can generate an automatic highlight with only their own materials, in this disclosure we present a new strategy that could combine raw materials from multiple users to generate a better video highlight. In the simplest scenario, these users could find a shared storage, e.g., dropbox to store all their materials, and then run our previous algorithm for automatic highlight. Such strategy would cause huge bandwidth waste as many of the materials uploaded to the shared folder will not be used in the highlight.

To speed up the highlight generation process and save unnecessary bandwidth, the illustrated method 1300 may be used. The method 1300 may include initializing 1302, by one ne of the user (called owner), the video highlight generation process. If only the owner's own materials on the owner's own device are to be used, then the method 1300 may be executed in the same manner for any of the other methods disclosed herein. If the owner intends to invite one or more friends to contribute to the highlight, then the owner may transmit 1304 a computer message to one or more friends that invites them to participate in the highlight process.

The method 1300 may include ranking 1306 material on the user devices of the owner and one or more of the friends who accept the invitation to participate. Ranking 1306 may include a ranking of cluster-based segments of media files and the selection of a portion thereof based on the ranking according to any of the methods described herein. The result of the rankings performed on the user devices of the friends may be transmitted 1308 to the owner's user device, such as in XML (extensible mark up language) or some other format. The result of the rankings may be segments selected according to any of the methods disclosed herein.

With all the ranking results on the owner's device, the owner user device executes 1310 another sorting algorithm (e.g. sorting the segments received from the friends and the segments selected on the user device according to a measure of importance of each segment). Sorting 1310 may include repeating one or more of the methods disclosed herein with respect to segments received as a result of the rankings performed on the user devices of the owner and the friends.

The top ranked segments from the aggregate of the segments from the friends and the segments on the owner's user computing device may then be selected 1312 in the same manner as for other methods disclosed herein. In particular, the segments selected may be selected such that the fit within a duration specified by the owner, such as using the method 1100 of FIG. 11, and according to a ranking of importance or energy according to any of the methods disclosed herein.

The segments selected at step 1312 may then be distributed 1314. In some embodiments, only those segments selected at step 1312 that were not received from a particular friend will be sent to that friend, thereby reducing storage requirements and network bandwidth. On the user device of the friends, the distributed 1314 segments and any of the selected 312 segments already on the user device will then be combined to compose 1316 the highlight video, which may then be played back. On the owner's device, the selected segments may simply be composed 1316 for playback.

Figure 14:
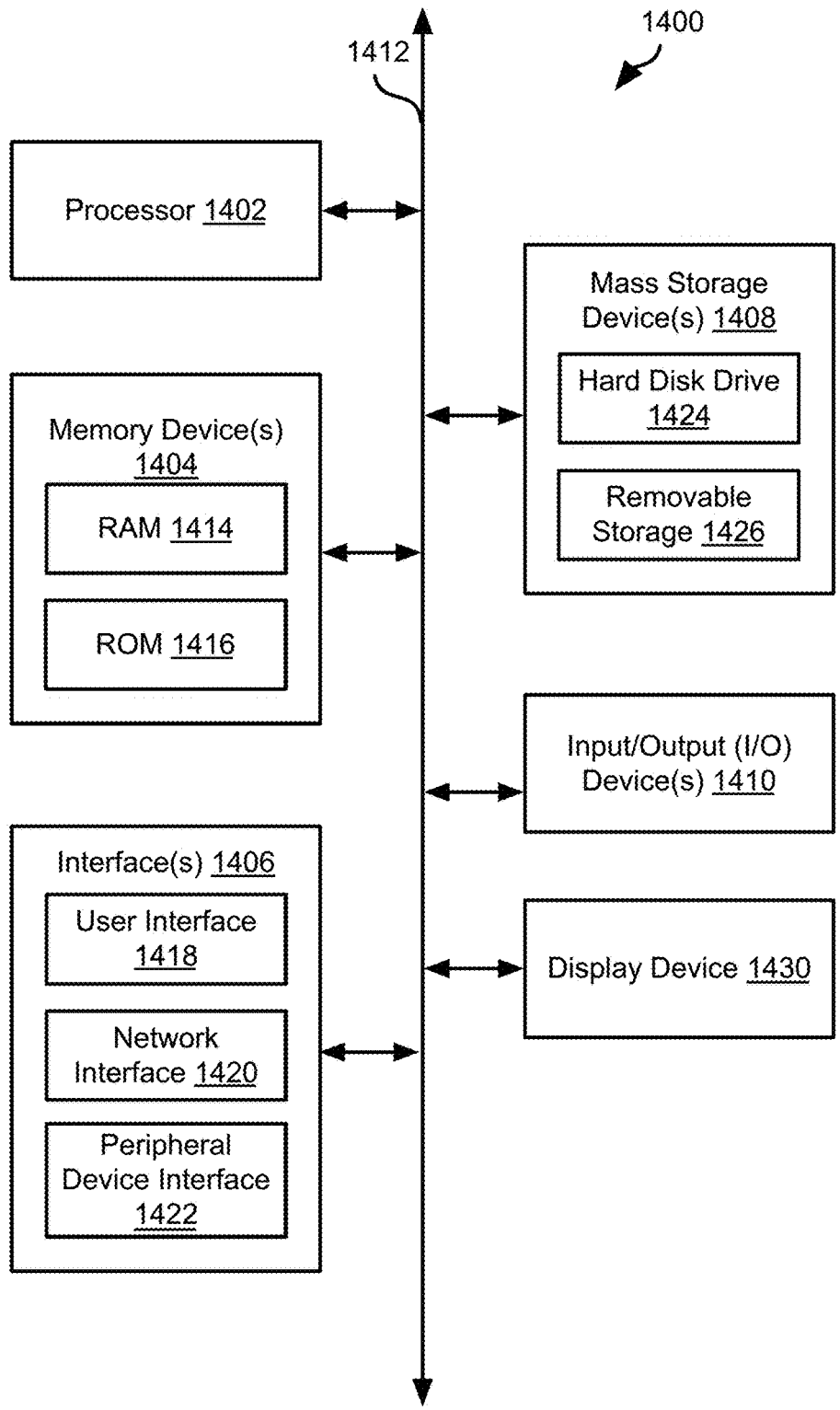
FIG. 14 is a schematic block diagram of a computing device suitable for implementing the systems and methods disclosed herein.

FIG. 14 is a block diagram illustrating an example computing device 1400. Computing device 1400 may be used to perform various methods, such as those discussed herein. Computing device 1400 can function as a server, a client, or any other computing entity. Computing device can perform various monitoring functions as discussed herein, and can execute one or more application programs, such as the application programs described herein. Computing device 1400 can be any of a wide variety of computing devices, such as a desktop computer, a notebook computer, a server computer, a handheld computer, tablet computer and the like.

Computing device 1400 includes one or more processor(s) 1402, one or more memory device(s) 1404, one or more interface(s) 1406, one or more mass storage device(s) 1408, one or more Input/Output (I/O) device(s) 1410, and a display device 1430 all of which are coupled to a bus 1412. Processor(s) 1402 include one or more processors or controllers that execute instructions stored in memory device(s) 1404 and/or mass storage device(s) 1408. Processor(s) 1402 may also include various types of computer-readable media, such as cache memory.

Memory device(s) 1404 include various computer-readable media, such as volatile memory (e.g., random access memory (RAM) 1414) and/or nonvolatile memory (e.g., read-only memory (ROM) 1416). Memory device(s) 1404 may also include rewritable ROM, such as Flash memory.

Mass storage device(s) 1408 include various computer readable media, such as magnetic tapes, magnetic disks, optical disks, solid-state memory (e.g., Flash memory), and so forth. As shown in FIG. 14, a particular mass storage device is a hard disk drive 1424. Various drives may also be included in mass storage device(s) 1408 to enable reading from and/or writing to the various computer readable media. Mass storage device(s) 1408 include removable media 1426 and/or non-removable media.

I/O device(s) 1410 include various devices that allow data and/or other information to be input to or retrieved from computing device 1400. Example I/O device(s) 1410 include cursor control devices, keyboards, keypads, microphones, monitors or other display devices, speakers, printers, network interface cards, modems, lenses, CCDs or other image capture devices, and the like.

Display device 1430 includes any type of device capable of displaying information to one or more users of computing device 1400. Examples of display device 1430 include a monitor, display terminal, video projection device, and the like.

Interface(s) 1406 include various interfaces that allow computing device 1400 to interact with other systems, devices, or computing environments. Example interface(s) 1406 include any number of different network interfaces 1420, such as interfaces to local area networks (LANs), wide area networks (WANs), wireless networks, and the Internet. Other interface(s) include user interface 1418 and peripheral device interface 1422. The interface(s) 1406 may also include one or more user interface elements 1418. The interface(s) 1406 may also include one or more peripheral interfaces such as interfaces for printers, pointing devices (mice, track pad, etc.), keyboards, and the like.

Bus 1412 allows processor(s) 1402, memory device(s) 1404, interface(s) 1406, mass storage device(s) 1408, and I/O device(s) 1410 to communicate with one another, as well as other devices or components coupled to bus 1412. Bus 1412 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1400, and are executed by processor(s) 1402. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method comprising:
   receiving, by a computer system, an input media file;
   decomposing, by the computer system, the input media file into a sequence frames;
   identifying, by the computer system, for each frame subsequent to a first frame of the sequence of frames, motion values of pixels of the each frame relative to a preceding frame of the plurality of frames;
   generating, by the computer system, a sequence of filtered motion values by smoothing the motion values of the sequence of frames;
   identifying, by the computer system, one or more hotspots in the media file from the sequence of filtered motion values, each hotspot of the one or more hotspots including a video segment of the media file; and
   generating an output including the one or more hotspots and excluding portions of the input media file not identified as hotspots.

2. The method of claim 1, wherein identifying the one or more hotspots in the media file comprises identifying locations in the media file corresponding to one or more local maxima in the sequence of filtered motion values each hotspot of the one or more hotspots including a segment of video corresponding to a local maximum of the one or more local maxima and extending before and after occurrence of the local maximum in the media file.

3. The method of claim 1, wherein identifying the motion values of the pixels of each frame comprises calculating optical flow of each frame of at least a portion of the sequence of frames.

4. The method of claim 1, wherein generating the sequence of filtered motion values by smoothing the motion values of the sequence of frames comprises averaging motion values for individual pixels within an individual frame of the sequence of frames.

* * * * *